(12) United States Patent
Noda et al.

(10) Patent No.: US 7,045,483 B2
(45) Date of Patent: May 16, 2006

(54) CATALYST ELEMENT

(75) Inventors: Naomi Noda, Ichinomiya (JP); Junichi Suzuki, Kuwana (JP); Kanji Yamada, Chita-gun (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/257,211

(22) PCT Filed: Jan. 18, 2002

(86) PCT No.: PCT/JP02/00305

§ 371 (c)(1),
(2), (4) Date: Oct. 10, 2002

(87) PCT Pub. No.: WO02/057012

PCT Pub. Date: Jul. 25, 2002

(65) Prior Publication Data

US 2003/0083197 A1    May 1, 2003

(30) Foreign Application Priority Data

Jan. 19, 2001 (JP) .............................. 2001-011058
Jul. 13, 2001 (JP) .............................. 2001-213258

(51) Int. Cl.
*B01J 23/00* (2006.01)

(52) U.S. Cl. ...................... 502/243; 502/250; 502/340; 502/344

(58) Field of Classification Search .............. 502/243, 502/250, 340, 344; 423/212, 349.1, 239.1
See application file for complete search history.

(56) References Cited

U.S. PATENT DOCUMENTS

| | | | |
|---|---|---|---|
| 4,843,056 A * | 6/1989 | Matsumoto et al. ........ | 502/302 |
| 5,814,576 A * | 9/1998 | Yamamoto ................. | 502/303 |
| 6,133,184 A * | 10/2000 | Kiyooka et al. ............. | 502/63 |
| 6,251,820 B1 * | 6/2001 | Tsuji ......................... | 502/242 |
| 6,372,688 B1 | 4/2002 | Yamashita et al. | |
| 6,432,859 B1 | 8/2002 | Iwakumi et al. | |
| 6,461,579 B1 * | 10/2002 | Hachisuka et al. ....... | 423/213.5 |
| 6,518,213 B1 * | 2/2003 | Yamamoto et al. .......... | 502/65 |
| 6,537,946 B1 * | 3/2003 | Tanada et al. .............. | 502/344 |
| 6,825,145 B1 * | 11/2004 | Tanada et al. ............... | 502/64 |
| 2001/0044376 A1 * | 11/2001 | Noda et al. .................. | 502/206 |
| 2002/0081255 A1 * | 6/2002 | Cutler et al. .............. | 423/213.5 |
| 2002/0082164 A1 * | 6/2002 | Dou et al. ................... | 502/304 |
| 2003/0040432 A1 * | 2/2003 | Beall et al. .................. | 502/332 |
| 2003/0154713 A1 * | 8/2003 | Hiratsuka et al. ............. | 60/297 |
| 2003/0211939 A1 * | 11/2003 | Tanada et al. .............. | 502/306 |

FOREIGN PATENT DOCUMENTS

| | | |
|---|---|---|
| EP | 1 008 378 | 6/2000 |
| EP | 1 016 448 | 7/2000 |
| JP | A 9-57099 | 3/1997 |
| JP | A 11-156209 | 6/1999 |
| JP | 2000-70717 | 3/2000 |
| JP | A 2000-93795 | 4/2000 |
| JP | A 2000-279810 | 10/2000 |
| JP | 1112774 A2 * | 7/2001 |
| JP | A 2001-314762 | 11/2001 |
| JP | 1174173 A1 * | 1/2002 |
| WO | WO 99/29417 * | 6/1999 |
| WO | WO 02/055181 A1 * | 7/2002 |

* cited by examiner

*Primary Examiner*—Steven Bos
(74) *Attorney, Agent, or Firm*—Oliff & Berridge, PLC

(57) ABSTRACT

A catalyst body is obtained by loading, on a carrier, a catalyst layer containing an alkali metal and/or an alkaline earth metal, wherein at least one kind of alkali metal and/or alkaline earth metal is allowed to be present in the carrier and/or between the carrier and the catalyst layer. With this catalyst body, the deterioration of the carrier caused by the alkali metal, etc. is prevented effectively and the long-term use has been made possible.

15 Claims, No Drawings

CATALYST ELEMENT

TECHNICAL FIELD

The present invention relates to a catalyst body containing an alkali metal such as Na, Li, Cs or the like and an alkaline earth metal such as Ca or the like, typified by an NOx trap catalyst used for purification of automobile exhaust gas.

BACKGROUND ART

In recent years, regulation for exhaust gas has become stricter, and lean burn engines, direct injection engines, etc. have come into wide use. In this connection, NOx-occluding catalysts capable of effectively purifying the NOx present in an exhaust gas, in a lean atmosphere have been put into practical use. As the NOx-occluding component used in the NOx-occluding catalyst, there are known alkali metals such as K, Na, Li, Cs and the like; alkaline earth metals such as Ba, Ca and the like; rare earth elements such as La, Y and the like; and so forth. Recently, attention has been paid to the addition effect of, in particular, K which is superior in NOx occludability at high temperatures.

NOx-occluding catalysts are generally constituted by loading a catalyst layer containing the above-mentioned NOx-occluding component, on a carrier composed of an oxide type ceramic material (e.g. cordierite) or a metallic material (e.g. a Fe-Cr-Al alloy). Such a carrier, however, has a problem; that is, it is easily corroded and deteriorated by alkali metals or some alkaline earth metals, particularly, K, Na, Li and Ca when they become active under the high temperatures of exhaust gas. In particular, a cordierite carrier constituted by an oxide type ceramic material has a serious problem; for example, the carrier reacts with the above-mentioned alkali metal, etc. and generates cracks.

To prevent such carrier deterioration, JP-A-2000-279810 discloses a technique which comprises allowing the porous oxide particles constituting a catalyst layer (a catalyst-loading layer) to contain silicon which is reactive with alkali metals, allowing the alkali metal present in the catalyst layer near its boundary with a carrier (a substrate) to react with the silicon before the alkali metal migrates into the carrier, thereby preventing the migration of the alkali metal into the carrier. The above literature discloses also a technique which comprises forming a zirconia layer between a carrier and a catalyst layer to allow the zirconia layer to prevent the migration of the alkali metal present in the catalyst layer, into the carrier.

However, of the techniques disclosed in the JP-A-2000-279810, the technique of allowing the porous oxide particles to contain silicon had a demerit in that while the migration of the alkali metal into the carrier is prevented, the alkali metal reacts with the silicon and loses its NOx adsorbability. In the case of forming a zirconia layer as an anti-corrosive between the carrier and the catalyst layer, the denseness of the zirconia layer as an intermediate layer is important to prevent the migration of the alkali metal effectively; however, it is practically very difficult to form the zirconia layer on the porous carrier without generation of any crack or pinhole, remaining of any exposed carrier portion, or the like.

The present invention has been made in view of the above situation, and aims at providing a catalyst body such as NOx-occluding catalyst, which comprises a carrier and a catalyst layer containing an alkali metal and an alkaline earth metal, loaded on the carrier, wherein the deterioration of the carrier caused by the alkali metal, etc. is prevented effectively and the long-term use of the catalyst has been made possible.

DISCLOSURE OF THE INVENTION

According to the present invention, there is provided a catalyst body comprising a carrier and a catalyst layer containing an alkali metal and/or an alkaline earth metal, loaded on the carrier, characterized in that at least one kind of alkali metal and/or alkaline earth metal is allowed to be present in the carrier and/or between the carrier and the catalyst layer.

BEST MODE FOR CARRYING OUT THE INVENTION

In the present invention, at least one kind of alkali metal and/or alkaline earth metal is allowed to be present in a carrier and/or between a carrier and a catalyst layer. By thus allowing an alkali metal and an alkaline earth metal (same or similar in properties as or to the alkali metal and alkaline earth metal contained in a catalyst layer as an NOx-occluding component) to be present in a carrier and between a carrier and a catalyst layer in a certain concentration, the alkali metal and alkaline earth metal in the catalyst layer hardly migrate into the carrier owing to the concentration gradient of the alkali metal and alkali earth metal even when the catalyst body is exposed to high temperatures during its use; as a result, the deterioration of the carrier caused by the reaction with the alkali metal, etc. is prevented.

The presence of an alkali metal in the carrier and/or between the carrier and the catalyst layer is preferred to the presence of an alkaline earth metal in the carrier and/or between the carrier and the catalyst layer, in view of that the alkali metal has the same properties as the alkali metal in the catalyst layer or is more similar thereto in properties thereto than the alkaline earth metal and therefore can prevent the migration of the alkali metal in the catalyst layer, into the carrier. However, the carrier may be corroded by the alkali metal unless the alkali metal is allowed to be present in a chemically stabilized state, for example, by allowing a component having a high affinity with the alkali metal, typified by Si, to coexist with the alkali metal; therefore, care must be taken for the form in which the alkali metal is allowed to be present. Use of a compound oxide between alkali metal and Si, such as $K_2SiO_3$ is a preferred embodiment. As the method for allowing an alkali metal and/or an alkaline earth metal to be present in the carrier and/or between the carrier and the catalyst layer, there can be mentioned the following methods.

(Method 1)

A carrier is dipped in a solution of relatively low viscosity containing an alkali metal and/or an alkaline earth metal both to be allowed to be present; thereby, the solution is infiltrated into the carrier and the alkali metal and the alkaline earth metal are allowed to be present mainly in the carrier. This method is used suitably when the carrier is porous.

(Method 2)

A powder of, for example, an alkali metal oxide and/or an alkaline earth metal oxide both to be allowed to be present is made into a slurry and the slurry is washcoated on a carrier. A binder typified by alumina sol or silica sol may be added to the slurry so that the slurry can have an increased adhesion strength to the carrier. In this method, the alkali metal and/or the alkaline earth metal is present mainly in an intermediate layer formed on the carrier by the washcoating.

(Method 3)

An alkali metal and/or an alkaline earth metal both to be allowed to be present is once loaded on a powder of a heat-resistant inorganic oxide such as γ-alumina, zirconia, titania or the like; they are made into a slurry; and the slurry is washcoated on a carrier. A binder may be added to the slurry. In this method as well, the alkali metal and/or the alkaline earth metal is present mainly in an intermediate layer formed on the carrier by the washcoating.

(Method 4)

When an alkali metal and/or an alkaline earth metal both to be allowed to be present can be made into a sol, a carrier may be dipped in the sol. In using such a sol, the presence of the alkali metal and/or the alkaline earth metal can be controlled to a certain extent by controlling the viscosity of the sol. For example, when a sol of low viscosity is used, the sol infiltrates into the carrier easily through the open pores of the carrier; when a sol of high viscosity is used, the sol tends to remain on the surface of the carrier and it is highly probable that the sol finally remains as an intermediate layer between the carrier and a catalyst layer.

(Method 5)

To a solution containing an alkali metal and/or an alkaline earth metal both to be allowed to be present is added, for viscosity increase, a sol such as alumina sol, zirconia sol, silica sol or the like; and a carrier is dipped therein. In this case as well, as in the method 4, the presence of the alkali metal and/or the alkaline earth metal can be controlled to a certain extent by controlling the viscosity of the solution.

When a honeycomb carrier is used, the method 1, the method 4 or the method 5 is preferred from a standpoint that the presence of an alkali metal and/or an alkaline earth metal suppresses the rise in pressure loss caused by the decrease in the open frontal area of honeycomb carrier, at a level as low as possible. When any of the above methods is used, it is preferred to conduct drying and/or firing for the purpose of fixation, after each dipping, washcoating, etc. When the fixation is conducted by firing, the firing temperature is preferably 400 to 800° C.

The alkali metal and/or alkaline earth metal to be allowed to be present in the carrier and/or between the carrier and the catalyst layer can be used in one kind or in combination of two or more kinds. Two or more kinds may be allowed to be present by the same method; one kind may be allowed to be present by two or more methods; two or more kinds may be allowed to be present by different methods. For example, a Ba-containing solution and a Mg-containing solution may be mixed and the mixed solution may be allowed to be present by the method 1. Or, it is a preferred embodiment that Ba is allowed to be present by the method 1 and then is allowed to be present, for reinforcement, by the method 2. Or, it is a preferred case that Ba is allowed to be present by the method 1 and then K is allowed to be present by the method 3 or the method 5. Besides, as an application of the method 2, it is possible, for example, that a MgO powder is dipped in a Ba-containing solution to prepare a Ba-predoped MgO powder and the powder is made into a slurry to be washcoated on a carrier.

Further, it is preferred to use an alkali metal and/or alkaline earth metal in combination with an alkali metal-reactive component or an alkali-resistant component, such as disclosed in JP-A-2000-279810, because such a combination use enhances the effect of prevention of carrier deterioration. For example, when Ba is allowed to be present by the method 1 and then a catalyst layer containing an alkali metal and Si (reactive with the alkali metal) is formed by coating, the alkali metal is first kept in the catalyst layer by Si and the alkali metal migrating toward the carrier can be blocked by Ba. It is also preferred to coat, on a carrier, an alumina (alkali-resistant component) sol or a silica (alkali metal-trapping component) sol and then coat BaO by the method 2 to block the penetration of an alkali metal from a catalyst layer by the two measures of different functions.

The alkali metal and/or the alkaline earth metal both allowed to be present, by the above-mentioned method, in the carrier and/or between the carrier and the catalyst layer may slightly contribute to NOx-occludability depending upon their kinds when a noble metal is allowed to coexist; however, the contribution is ordinarily small because they are used inside the catalyst layer and hardly contact with an exhaust gas which is passed through the present catalyst. Meanwhile, the alkali metal and/or the alkaline earth metal is allowed to be present preferably in a stable state in view of their intended role of blocking the migration of the alkali metal, etc. contained in the catalyst layer, into the carrier. Therefore, it is preferred that they are allowed to have no catalytic activity, that is, no noble metal component is used except in the catalyst layer. Incidentally, a component not reducing the stability of the alkali metal and/or the alkaline earth metal, for example, a binder-derived component may be contained in the intermediate layer, etc., together with the alkali metal and/or the alkaline earth metal.

As to the shape of the carrier used in the catalyst body of the present invention, there is no particular restriction. The above-mentioned effect of prevention of carrier deterioration can be obtained when there is used any carrier having a shape such as cell structure (e.g. monolithic honeycomb or ceramic foam), pellet, bead, ring or the like. The largest effect is obtained when a carrier of honeycomb shape having a large number of through-holes formed by thin walls, i.e. a honeycomb carrier is used.

As the material of the honeycomb carrier, there can be preferably used a ceramic such as cordierite, mullite, alumina, zirconia, titanina, zirconyl phosphate, aluminum titanate, SiC, SiN or the like; a foil-shaped metal made of a heat-resistant stainless steel such as Fe-Cr-Al alloy or the like; a honeycomb structure produced by powder metallurgy; etc. When, of these, a carrier made of cordierite reactive with Li, Na, K and Ca is used, the largest effect of deterioration prevention is obtained.

The through-hole shape (cell shape) of the honeycomb carrier may be any of circle, polygon, corrugation, etc. The external shape of the honeycomb carrier may be formed so as to fit the internal shape of an exhaust gas system in which the honeycomb carrier is to be placed.

As to the cell density of the honeycomb carrier, there is no particular restriction, either. However, the cell density is preferably 6 to 1,500 cells/in.$^2$ (0.9 to 233 cells/cm$^2$) in order for the honeycomb carrier to be used as a catalyst carrier. The thickness of the partition wall of the honeycomb carrier is preferably 20 to 2,000 µm. When the thickness is as small as 20 to 200 µm, the diffusion of the alkali metal and/or the alkaline earth metal from the catalyst layer to the center of the carrier partition wall is easy; therefore, the necessity of the present invention is high and a large effect of deterioration prevention is obtained.

When a honeycomb carrier is used, the amount loaded on the honeycomb carrier, of the alkali metal and/or the alkaline earth metal allowed to be present in the carrier and/or between the carrier and the catalyst layer is preferably 0.05 to 3.0 moles/L in terms of alkali metal element and/or alkaline earth metal element per unit volume of honeycomb carrier. When the loaded amount is below the range, the prevention of the migration of the alkali metal, etc. contained in the catalyst layer, into the carrier is insufficient; when the loaded amount is above the range, the above prevention levels off and the pressure loss increases. The loaded amount is more preferably 0.1 to 2.0 moles/L, further preferably 0.15 to 1.0 mole/L. Incidentally, the loaded amount of the alkali metal and/or the alkaline earth metal in terms of oxide weight is preferably 10 to 150 g/L, more preferably 20 to 100 g/L per unit volume of honeycomb carrier.

In forming, by coating, an intermediate layer containing the alkali metal and/or the alkaline earth metal, on the honeycomb carrier, the intermediate layer is preferred to have a thickness of 0.5 time or less the thickness of the catalyst layer. Also, the thickness of the intermediate layer is preferably 50 µm or less, more preferably 30 µm or less. When the thickness of the intermediate layer is larger than 0.5 time the thickness of the catalyst layer or exceeds 50 µm, the prevention of the migration of the alkali metal contained in the catalyst layer, into the carrier levels off and the pressure loss increases. When a honeycomb carrier of polygonal or corrugated cell shape is used, any coating layer formed on the carrier generally tends to have a larger thickness at each corner of cell, and the thickness of the intermediate layer or the catalyst layer referred herein is based on the thickness measured at the center of the two adjacent intersections of partition walls (the center of each cell side).

As mentioned previously, in the present invention, the concentration gradient is utilized to prevent the migration of the alkali metal and/or the alkaline earth metal contained in the catalyst layer, into the carrier. Therefore, it is preferred that the concentration of the alkali metal and/or the alkaline earth metal in the carrier or the intermediate layer is higher than the concentration of the alkali metal and/or the alkaline earth metal in the catalyst layer. As the difference in these concentrations is larger, the concentration gradient between the carrier side (or the intermediate layer side) and the catalyst layer side is larger, and the migration of the alkali metal, etc. contained in the catalyst layer, into the carrier is prevented to a higher extent.

The catalyst body of the present invention may be used in combination with an NOx-occluding catalyst material of different component composition, a different catalyst material typified by a three-way catalyst, a co-catalyst material, a HC adsorbent material, other purification material for use in exhaust gas system, etc. In that case, they may be mixed into the catalyst layer of the present catalyst body or their layers may be laminated on the catalyst layer. Or, they may be prepared as an independent material and may be appropriately combined with the present catalyst in an exhaust gas system.

The present invention is described in more detail below by way of Examples. However, the present invention is in no way restricted to these Examples.

[Preparation of washcoating slurry of K-containing NOx-occluding catalyst]

An aqueous $(NH_3)_2Pt(NO_2)_2$ solution and an aqueous $KNO_3$ solution were mixed. In the mixed solution was dipped a commercial γ-$Al_2O_3$ powder (specific surface area: 200 m$^2$/g), followed by stirring to pulverize in a pot mill for 2 hours. Then, water was evaporated from the resultant to the dryness. Thereafter, dry disintegration was conducted, followed by firing in an electric furnace at 600° C. for 3 hours. To the thus-obtained (Pt+K)-predoped γ-$Al_2O_3$ powder were added an $Al_2O_3$ sol and water. The mixture was wet pulverization in a pot mill to prepare a washcoating slurry of K-containing NOx-occluding catalyst (this slurry is hereinafter referred to as "K catalyst slurry"). The amounts of Pt and K relative to γ-$Al_2O_3$ were adjusted in the step of mixing and dipping so that at a final timing when the slurry was coated on a honeycomb carrier and firing was over, the amount of Pt became 30 g/cft (1.06 g/L) (the weight of Pt element per honeycomb volume) and the amount of K became 10 g/L (the weight of K element per honeycomb volume) when the amount of the K catalyst loaded was 100 g/L (per honeycomb volume). The amount of the $Al_2O_3$ sol added was such that its solid content was 5% by weight of the total $Al_2O_3$ in terms of $Al_2O_3$; and the water was added in an appropriate amount so that the resulting slurry had a viscosity allowing easy washcoating.

[Preparation of Samples]

EXAMPLE 1

A cordierite honeycomb carrier [partition wall thickness: 6 mil (0.15 mm), cell density: 400 cpsi (62 cells/cm$^2$), porosity: 30%] was dipped in a Ba-containing aqueous solution. The excessive solution in the cells was blown off and the carrier was dried. The resulting honeycomb carrier was fired in an electric furnace at 700° C. for 1 hour. The amount of Ba loaded was controlled so as to become 70 g/L in terms of oxide weight per unit volume of honeycomb carrier (0.46 mole/L in terms of Ba mole), by adjusting the concentration of the aqueous solution, the times of dipping, etc. In the measurement, the weight difference of the honeycomb carriers before and after Ba loading was determined and taken as loaded Ba amount (oxide weight). The honeycomb carrier after firing was washcoated with the K catalyst slurry, followed by drying. This step was as necessary repeated until the amount of K-containing NOx-occluding catalyst loaded became 100 g/L. Then, firing was conducted again in an electric furnace at 600° C. for 1 hour to obtain a K-containing NOx-occluding catalyst body 1.

EXAMPLE 2

A K-containing NOx-occluding catalyst body 2 was obtained in the same manner as in Example 1 except that the amount of Ba loaded was changed to 0.10 mole/L.

EXAMPLE 3

A K-containing NOx-occluding catalyst body 3 was obtained in the same manner as in Example 1 except that the Ba-containing aqueous solution was changed to a Mg-containing aqueous solution and the amount of Mg loaded was controlled at 0.46 mole/L.

EXAMPLE 4

A K-containing NOx-occluding catalyst body 4 was obtained in the same manner as in Example 1 except that the Ba-containing aqueous solution was changed to a Cs-containing aqueous solution and the amount of Cs loaded was controlled at 0.46 mole/L.

EXAMPLE 5

A K-containing NOx-occluding catalyst body 5 was obtained in the same manner as in Example 1 except that the Ba-containing aqueous solution was changed to a solution obtained by mixing a K-containing aqueous solution with an $Al_2O_3$ sol. In order for the amount of K loaded on the honeycomb carrier from the solution obtained by mixing a K-containing aqueous solution with an $Al_2O_3$ sol, to become 0.46 mole/L, the concentration of the aqueous solution, the times of dipping, etc. were adjusted.

EXAMPLE 6

A K-containing NOx-occluding catalyst body 6 was obtained in the same manner as in Example 1 except that the Ba-containing aqueous solution was changed to an aqueous $K_3PO_4$ solution. In order for the amount of K loaded on the honeycomb carrier from the aqueous $K_3PO_4$ solution, to become 0.46 mole/L, the concentration of the aqueous solution, the times of dipping, etc. were adjusted.

EXAMPLE 7

A K-containing NOx-occluding catalyst body 7 was obtained in the same manner as in Example 1 except that the Ba-containing aqueous solution was changed to an aqueous $K_2SiO_3$ solution. In order for the amount of K loaded on the honeycomb carrier from the aqueous $K_2SiO_3$ solution, to become 0.46 mole/L, the concentration of the aqueous solution, the times of dipping, etc. were adjusted.

COMPARATIVE EXAMPLE

The K catalyst slurry was washcoated on a cordierite honeycomb carrier [partition wall thickness: 6 mil (0.15 mm), cell density: 400 cpsi (62 cells/$cm^2$), porosity: 30%], followed by drying. This step was as necessary repeated until the amount of K-containing NOx-occluding catalyst loaded became 100 g/L. Then, firing was conducted in an electric furnace at 600° C. for 1 hour to obtain a K-containing NOx-occluding catalyst body 8.

[Durability test]

The K-containing NOx-occluding catalyst bodies 1 to 8 obtained above were subjected to an accelerated durability test of 850° C. and 30 hours in an electric furnace with 10% of moisture allowed to coexist.

[Evaluation of preventability of carrier deterioration]

The K-containing NOx-occluding catalyst bodies 1 to 8 after durability test were examined for extent of crack generation using a stereoscopic microscope and an electron microscope. Further, test pieces were cut out to measure initial and after-durability-test bending strengths, and a reduction in after-durability-test flexural strength relative to initial flexural strength was determined. The results are shown in the following table.

[Measurement of residual K amount in catalyst layer]

The K-containing NOx-occluding catalyst bodies 1 to 8 after durability test were measured for residual K concentration in catalyst layer. The results are shown in the following table. It is presumed that a catalyst body of higher residual K concentration has a higher NOx occludability.

TABLE 1

| | No. of K-containing NOx-occluding Catalyst body | Substance Loaded on Carrier prior to Loading of Catalyst layer | Loaded amount (mole/L) | Amount of crack Generation | Reduction in flexural strength* (%) | Residual K conc.** (%) |
|---|---|---|---|---|---|---|
| Example 1 | 1 | Ba | 0.46 | Slight | 29 | 77 |
| Example 2 | 2 | Ba | 0.10 | Small | 37 | 71 |
| Example 3 | 3 | Mg | 0.46 | Small | 39 | 64 |
| Example 4 | 4 | Cs | 0.46 | Small | 41 | 62 |
| Example 5 | 5 | K | 0.46 | Small | 38 | 67 |
| Example 6 | 6 | K | 0.46 | Small | 46 | 58 |

TABLE 1-continued

|  | No. of K-containing NOx-occluding Catalyst body | Substance Loaded on Carrier prior to Loading of Catalyst layer | Loaded amount (mole/L) | Amount of crack Generation | Reduction in flexural strength* (%) | Residual K conc.** (%) |
|---|---|---|---|---|---|---|
| Example 7 | 7 | K | 0.46 | Slight | 25 | 75 |
| Comparative Example | 8 | — | — | Large | 74 | 29 |

*Reduction in after-durability-test strength relative to initial strength.
**Initial concentration was taken as 100%.

As is clear from the results shown in Table 1, each of the K-containing NOx-occluding catalyst bodies 1 to 7 (Examples 1 to 7) according to the present invention, as compared with the K-containing NOx-occluding catalyst body 8 (Comparative Example) in which neither alkali metal nor alkaline earth metal was loaded on the honeycomb carrier prior to loading of the catalyst layer after durability test, showed a high residual K concentration in catalyst layer and was low in crack generation due to carrier corrosion caused by migration of K in catalyst layer, into honeycomb carrier, as well as in reduction in strength.

INDUSTRIAL APPLICABILITY

As described above, in the catalyst body of the present invention, at least one kind of alkali metal and/or alkaline earth metal is allowed to be present in the carrier and/or between the carrier and the catalyst layer; thereby, the migration of the alkali metal and/or the alkaline earth metal contained in the catalyst layer, into the carrier is prevented. As a result, the deterioration of the carrier caused by the alkali metal and/or the alkaline earth metal is prevented and the long-term use of the catalyst body is made possible.

The invention claimed is:

1. A catalyst body comprising:
a carrier, and
a catalyst layer containing a catalyst layer alkali metal and/or alkaline earth metal loaded on the carrier,
wherein the carrier is impregnated with a carrier alkali metal and/or alkaline earth metal prior to loading of the catalyst layer.

2. A catalyst body according to claim 1, wherein the carrier is impregnated with the carrier alkali metal and/or alkaline earth metal by infiltrating the carrier alkali metal and/or alkaline earth metal into the carrier.

3. A catalyst body according to claim 1, wherein the carrier is a honeycomb carrier.

4. A catalyst body according to claim 2, wherein the carrier is a honeycomb carrier.

5. A catalyst body according to claim 3, wherein the honeycomb carrier carries 0.05 to 3.0 mole/L of the carrier alkali metal and/or alkaline earth metal per unit volume of the honeycomb carrier.

6. A catalyst body according to claim 4, wherein the honeycomb carrier carries 0.05 to 3.0 mole/L of the carrier alkali metal and/or alkaline earth metal per unit volume of the honeycomb carrier.

7. A catalyst body according to claim 2, wherein the concentration of the carrier alkali metal and/or alkaline earth metal in the carrier is higher than the concentration of the catalyst layer alkali metal and/or alkaline earth metal in the catalyst layer.

8. A catalyst body according to claim 1, wherein the main constituent material of the carrier is cordierite.

9. A catalyst body according to claim 1, wherein the carrier alkali metal and/or alkaline earth metal is also present between the carrier and the catalyst layer.

10. A catalyst body comprising:
a carrier,
a catalyst layer containing a catalyst layer alkali metal and/or alkaline earth metal, and
an intermediate layer containing an intermediate layer alkali metal and/or alkaline earth metal,
wherein said intermediate layer is formed by at least partially coating said carrier with said intermediate layer alkali metal and/or alkaline earth metal, and said catalyst layer is formed on said intermediate layer by loading a catalyst containing said catalyst layer alkali metal and/or alkaline earth metal, and
wherein the concentration of the intermediate layer alkali metal and/or alkaline earth metal contained in said intermediate layer is higher than the concentration of the catalyst layer alkali metal and/or alkaline earth metal contained in said catalyst layer.

11. A catalyst body according to claim 10, wherein the intermediate layer has a thickness of 0.5 times or less the thickness of the catalyst layer.

12. A catalyst body according to claim 10, wherein the intermediate layer has a thickness of 50 μm or less.

13. A catalyst body according to claim 10, wherein the carrier is a honeycomb carrier.

14. A catalyst body according to claim 13, wherein the honeycomb carrier carries 0.05 to 3.0 mole/L of the intermediate layer alkali metal and/or alkaline earth metal per unit volume of the honeycomb carrier.

15. A catalyst body according to claim 10, wherein the main constituent material of the carrier is cordierite.

* * * * *